United States Patent
Horiuchi et al.

(10) Patent No.: US 7,873,440 B2
(45) Date of Patent: Jan. 18, 2011

(54) VARIABLE TOE ANGLE CONTROL SYSTEM FOR A VEHICLE

(75) Inventors: Yutaka Horiuchi, Wako (JP); Akihko Koike, Wako (JP); Hiroaki Sasaki, Wako (JP); Takashi Yanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/830,391

(22) Filed: Jul. 30, 2007

(65) Prior Publication Data

US 2008/0051941 A1 Feb. 28, 2008

(30) Foreign Application Priority Data

Aug. 25, 2006 (JP) .............................. 2006-228552

(51) Int. Cl.
*G05B 13/00* (2006.01)
*G06F 7/00* (2006.01)
(52) U.S. Cl. ........................... 700/279; 701/36; 701/33; 180/408; 180/415; 180/412; 280/86.75; 280/86.758; 280/5.522
(58) Field of Classification Search .............. 280/86.75, 280/86.758, 5.522; 180/408, 415, 412; 701/36, 701/33
See application file for complete search history.

(56) References Cited

U.S. PATENT DOCUMENTS

| 4,371,191 | A |   | 2/1983 | Goldberg et al. |
| 4,726,603 | A | * | 2/1988 | Sugiyama et al. ...... 280/86.758 |
| 4,768,603 | A | * | 9/1988 | Sugiyama et al. ........... 180/408 |
| 4,786,066 | A | * | 11/1988 | Kondo et al. ................. 180/415 |
| 5,107,425 | A | * | 4/1992 | Donges et al. ................. 701/33 |
| 5,143,400 | A | * | 9/1992 | Miller et al. ............. 280/5.522 |
| 5,195,601 | A | * | 3/1993 | Voigt et al. ................... 180/412 |

(Continued)

FOREIGN PATENT DOCUMENTS

JP          63-192671         8/1988

(Continued)

OTHER PUBLICATIONS

Control Theory —Wikipedia, Date : N/A.*

(Continued)

*Primary Examiner*—Khoi Tran
*Assistant Examiner*—Ian Jen
(74) *Attorney, Agent, or Firm*—Rankin, Hill & Clark LLP

(57) ABSTRACT

A variable toe angle control system for a vehicle that can be incorporated with a fail-safe mechanism. When a fault of the system is detected, at least one of toe-angle actuators is actuated to make toe angles of two wheels agree with each other. When one of the wheels has become fixed in position without regard to a control signal supplied to the corresponding actuator, the actuator for the other wheel is actuated so as to make the toe angles of the two wheels equal to each other. When at least one toe-angle sensor is found faulty, the actuators are both actuated until the actuators reach positions corresponding to stoppers. When information for determining target values of the toe angles of the right and left wheels is found faulty, the actuators are both actuated until the actuators reach positions corresponding to prescribed reference toe positions.

6 Claims, 4 Drawing Sheets

U.S. PATENT DOCUMENTS

| | | | | |
|---|---|---|---|---|
| 5,438,515 A * | 8/1995 | Miichi et al. | ............ | 701/36 |
| 6,283,483 B1 * | 9/2001 | Johnson et al. | ....... | 280/86.758 |
| 6,962,356 B2 * | 11/2005 | Kwon | ............ | 280/86.75 |
| 7,325,818 B1 * | 2/2008 | Kwon | ............ | 280/86.758 |
| 7,416,264 B2 * | 8/2008 | Tsukasaki | ............ | 303/189 |
| 2001/0022655 A1 * | 9/2001 | Stieff | ............ | 356/139.09 |
| 2002/0167218 A1 * | 11/2002 | Chubb | ............ | 303/5 |
| 2003/0209869 A1 * | 11/2003 | Kwon | ............ | 280/86.75 |

FOREIGN PATENT DOCUMENTS

| | | |
|---|---|---|
| JP | 9-030438 | 2/1997 |
| JP | 2001-322557 | 11/2001 |
| JP | 2005-247103 | 9/2005 |

OTHER PUBLICATIONS

JP 2005-247103 in view of English Translation.*

* cited by examiner

VARIABLE TOE ANGLE CONTROL SYSTEM FOR A VEHICLE

TECHNICAL FIELD

The present invention relates to a variable toe angle control system for a vehicle that can individually vary the toe angles of the right and left wheels.

BACKGROUND OF THE INVENTION

It is known to provide a linear actuator such as a hydraulic cylinder between a vehicle body end of a lateral link or a trailing arm of a wheel suspension unit for supporting each rear wheel and the vehicle body, and to individually control the toe angles of the right and left wheels by extending or retracting the corresponding linear actuators (see Japanese patent publication No. 8-25482 and Japanese patent laid open publication No. 9-30438).

In such a system, a fail-safe mechanism is required so that the vehicle may be able to continue to travel without any inconvenience even in case of a failure of the system. For instance, the hydraulic actuator described in Japanese patent publication No. 8-25482 is provided with a piston rod that is resiliently urged by a spring member in the direction to retract the piston rod in such a manner that the toe angle is automatically restored to a zero angle when the hydraulic pressure is lost.

However, according to this prior art, when extending the piston rod under a normal condition, the hydraulic pressure is required to be high enough to oppose the spring force which is capable of maintaining the toe angle against the reaction from the road surface in case of a failure of the actuator so that the actuator and hydraulic pressure generator are required to be relatively large in size.

When the actuator is based on the use of a threaded rod, and the lead angle of the thread is selected in such a manner that the actuator remains immobile owing to the friction, because the linear displacement of the actuator is impossible without turning the threaded rod, there is some difficulty in providing a fail-safe mechanism.

BRIEF SUMMARY OF THE INVENTION

In view of such problems of the prior art, an object of the present invention is to provide a variable toe angle control system for a vehicle that can be incorporated with a fail-safe mechanism without complicating the structure, increasing the size of the system or requiring any additional power requirements.

Another object of the present invention is to provide a method for controlling the toe angle of a vehicle that allows a fail-safe mechanism to be incorporated in the hardware structure without complicating the structure, increasing the size of the system or requiring any additional power requirements.

According to the present invention, such objects can be accomplished by providing a variable toe angle control system for a vehicle, comprising: a pair of actuators for individually varying toe angles of a right and left wheel; a pair of sensors for individually detecting the toe angles of the right and left wheels; and a control unit for determining a target value for each of the right and left wheels according to operating conditions of the vehicle and supplying a control signal to each of the actuators according to an output of the corresponding sensor and the corresponding target value; wherein the control unit is configured to detect a fault of the system and actuate at least one of the actuators to make the toe angles of the two wheels agree with each other when a fault is detected in a part of the system.

The present invention also provides a method for controlling toe angles of a vehicle in a variable toe angle control system, comprising: preparing a pair of actuators for individually varying toe angles of a right and left wheel; preparing a pair of sensors for individually detecting the toe angles of the right and left wheels; determining a target value for each of the right and left wheels according to operating conditions of the vehicle; supplying a control signal to each of the actuators according to an output of the corresponding sensor and the corresponding target value; detecting a fault of the system; and actuating at least one of the actuators to make the toe angles of the two wheels agree with each other when a fault is detected in a part of the system.

Thereby, in any situation, the toe angles of the two wheels are made to agree with each other, although the toe angle control is disabled, the vehicle can continue to travel without incurring any major inconveniences. Therefore, according to the present invention, even when the variable toe angle control system becomes unable to provide a normal control function, there is no need for a return spring device that would be otherwise required to force the wheels to neutral positions and to ensure the capability of the vehicle to travel along a straight path so that the structure can be made simple and the power source may consist of a compact structure owing to the absence of the need to have the actuator produce a force to oppose the spring force of the return spring device for forcing the wheels to the neutral positions.

When one of the wheels has become fixed in position without regard to the control signal supplied to the corresponding actuator, the actuator for the other wheel may be actuated so as to make the toe angles of the two wheels equal to each other. When at least one of the sensors is found to be faulty, both the actuators may be actuated until the actuators reach positions corresponding to stoppers that may be provided in suitable locations. When information for determining target values of the toe angles of the right and left wheels is found to be faulty, both the actuators may be actuated until the actuators reach positions corresponding to prescribed reference toe positions.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
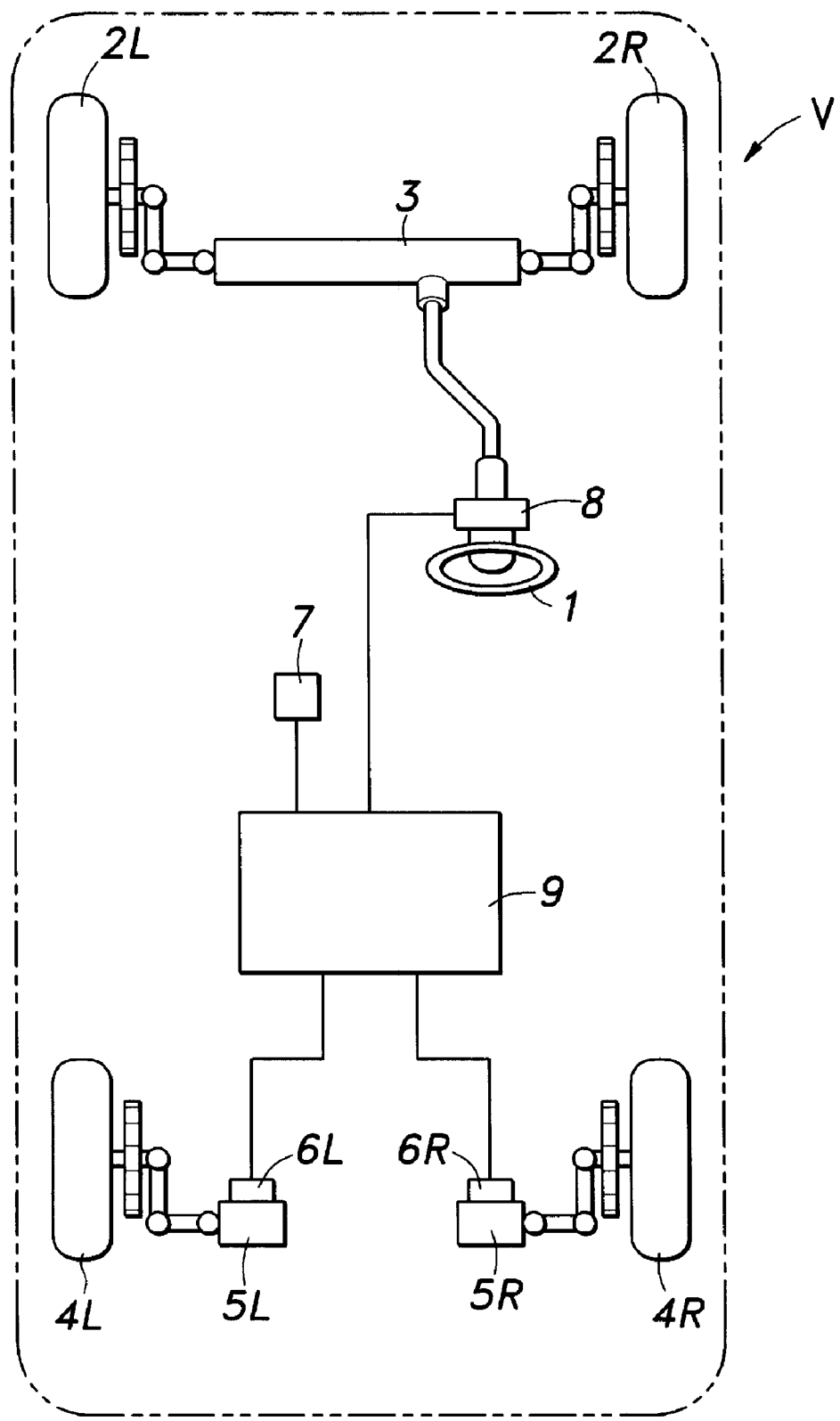
FIG. 1 is a schematic view of a vehicle to which the present invention is applied.

FIG. 1 shows an outline of a vehicle V to which the present invention is applied. The vehicle V comprises a front wheel steering device 3 for directly steering a right and left front wheel 2L and 2R according to a steering angle of a steering wheel 1. The vehicle V further comprises a right and left actuator 5L and 5R for individually changing the toe angles of a right and left rear wheel 4L and 4R by varying the lengths of parts, such as laterals links, of rear wheel suspension units supporting the right and left rear wheels 4L and 4R, respectively. The vehicle V further comprises a right and left toe angle sensor 6L and 6R for individually detecting the toe angles of the right and left rear wheels 4L and 4R, an accelerator sensor 7 for detecting a fore-and-aft acceleration acting upon the vehicle body to use it as a reference signal for determining a target control value in the variable toe angle control, and a steering angle sensor 8 for detecting the steering angle of the steering wheel 1. The vehicle V further comprises a control unit 9 for controlling the displacements of the actuators 5L and 5R according to the outputs of the various sensors. The fore-and-aft acceleration can also be computed from the signals of wheel speed sensors provided on the corresponding wheels 2L, 2R, 4L and 4R and pedal stroke sensors provided on an accelerator pedal and brake pedal.

Each actuator 5L, 5R may consist of a rotary motion/linear motion converter combining an electric motor fitted with a reduction gear and a thread mechanism, a cylinder device that linearly actuates a piston rod by using hydraulic pressure or any other known linear actuator. Each toe angle sensor 6L, 6R may consist of a potentiometer or any other known displacement sensor, but preferably consists of an electromagnetic sensor or other non-contact sensor for an improved durability.

According to such a variable toe angle control system, the toe-in and toe-out of the rear wheels 4L and 4R can be freely controlled under a prescribed condition by simultaneously actuating the right and left actuators 5L and 5R in a symmetric manner. If one of the right and left actuators 5L and 5R is extended while the other is retracted, the two rear wheels 4L and 4R may be steered either in the right or left direction.

The target value for each rear wheel 4L, 4R can be obtained from a map of optimum toe angle with respect to such running conditions as the front wheel steering angle and fore-and-aft acceleration. While feeding back the output (actual toe position) of each toe angle sensor 6L, 6R, an optimum torque that should be produced from the corresponding actuator 5L, 5R is computed from the deviation of the actual toe angle from a target toe angle, and an electric motor is duty controlled so as to produce the optimum torque through a current feedback. By thus forming a multiple feedback loops, a highly responsive and stable control is enabled.

Figure 2:
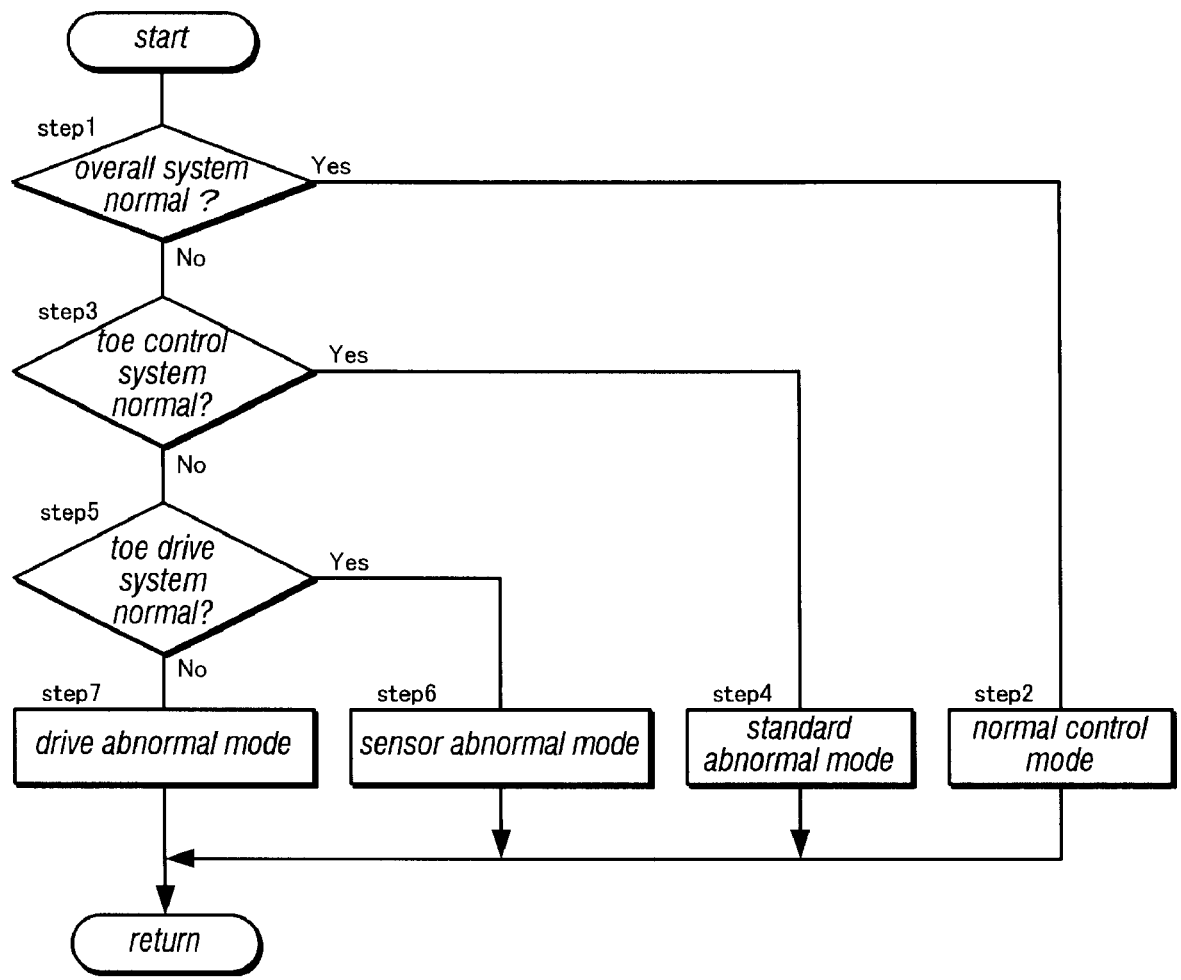
FIG. 2 is a flowchart of a control process of a system of the present invention.

FIG. 2 shows a control flow of the system of the present invention. First of all, it is determined if the overall system is operating normally (step 1). If the overall system is operating normally (Yes), a normal variable toe angle control is executed as described above (step 2). If an abnormal operation of the overall system is detected (No), it is determined if this abnormal operation is such that the basic data, such as front wheel steering angle and acceleration, for setting a control target value for the rear wheels is not available or the intelligent part of the variable toe angle control system itself is faulty (step 3). If the fault is in the intelligent part of the system, and not in drive system or the sensing system of the variable toe angle control system (Yes), a standard abnormal mode is executed (step 4).

Figure 3:
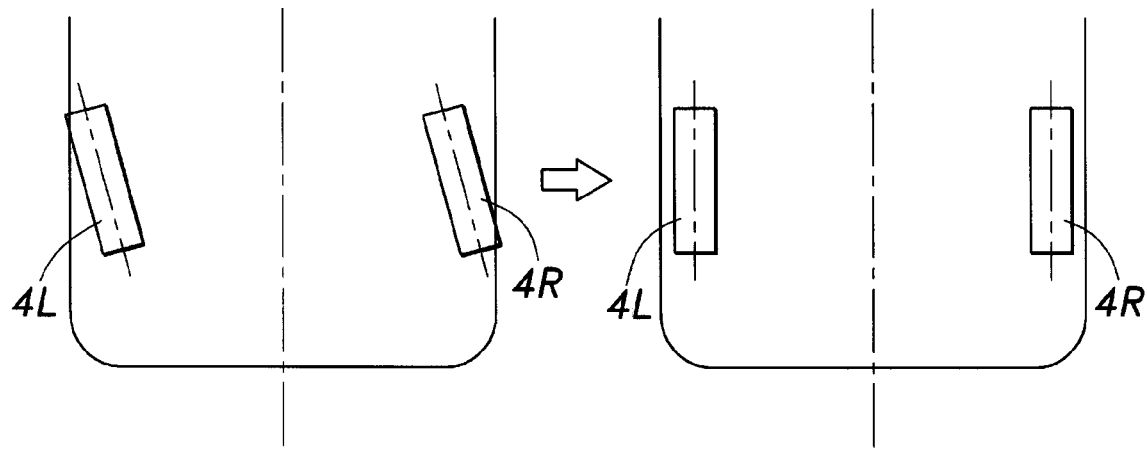
FIG. 3 is a diagram showing a mode of operation in a standard abnormal mode.

In this case, because the proper toe angle cannot be computed although the actuators 5L and 5R as well as the driver circuits thereof are in good order, the variable toe angle control is terminated, and the two actuators are actuated toward a prescribed position such as a zero toe angle position (FIG. 3). The vehicle is then able to operate in a same manner as a conventional vehicle, however, without any toe angle control.

An abnormal condition other than that of the intelligent part of the variable toe angle control system can be determined as a failure to achieve a prescribed relationship between the speed difference ΔV between the two rear wheels 4L and 4R, the average speed V of the right and left wheels and the steering angle δ for more than a prescribed time period. More specifically, the speed difference ΔV between the two rear wheels 4L and 4R is substantially inversely proportional to the yaw rate γ, and a relationship γ=V/L·δ (where L is the wheel base) holds between the yaw rate γ, average speed V of the right and left wheels and steering angle δ under a steady state condition. If this relationship fails to hold in a pronounced way, it can be concluded that the wheel speed sensor is faulty.

Figure 4:
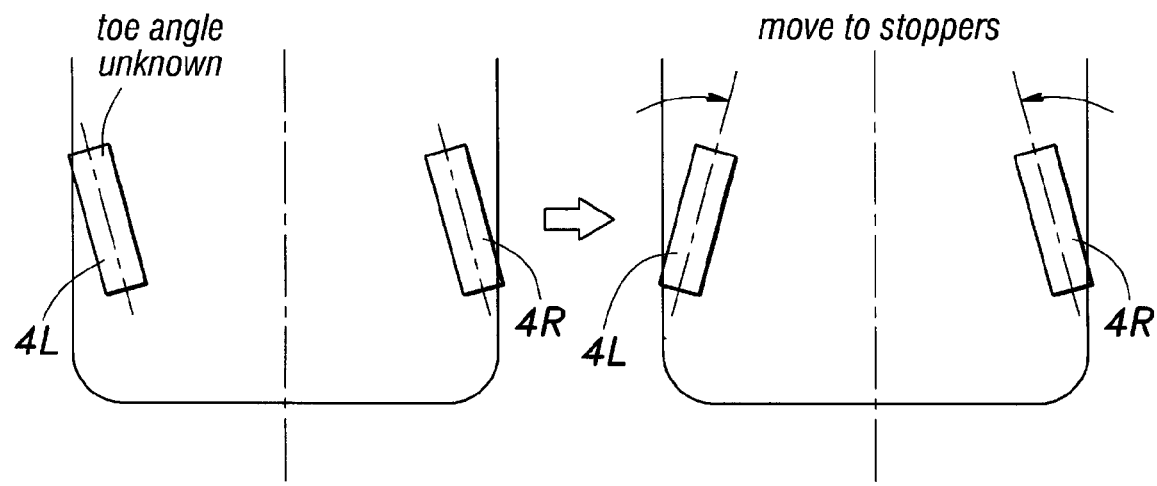
FIG. 4 is a diagram showing a mode of operation in a sensor system abnormal mode.

If the variable toe angle control system is found to be faulty in step 3 (No), it is determined whether the fault is in the drive system of either one of the actuators 5L and 5R or either one of the toe angle sensors 6L and 6R (step 5). If the drive systems of the actuators 5L and 5R are in good order but at least one of the toe angle sensors 6L and 6R is found to be faulty (Yes), a sensor system abnormal mode is executed (step 6). In this case, the actuators 5L and 5R can operate in a normal fashion, but the actuator corresponding to the faulty toe angle sensor is unable to determine its own position. Therefore, the two actuators are both actuated to safe positions (with some toe-in) defined by mechanical stoppers by using an open loop so that the vehicle is allowed to travel in a stable manner (FIG. 4).

Any abnormal condition in the toe angle sensors 6L and 6R can be detected when an abrupt change in the output is detected or when the output deviates from a normal range for more than a prescribed time period. Also, a redundant sensor having two outputs can be used. In this case, a fault is detected if a prescribed relationship fails to be hold between the two outputs.

Figure 5:
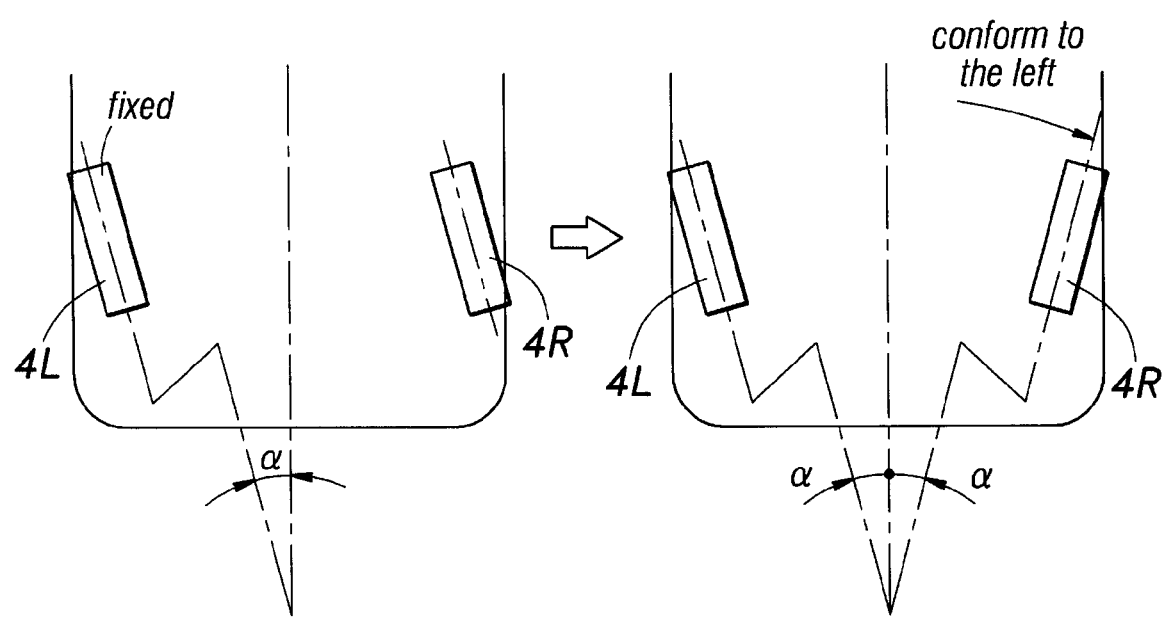
FIG. 5 is a diagram showing a mode of operation in a drive system abnormal mode.

If a fault is detected in any of the drive systems such as one of the actuators (No), a drive system abnormal mode is executed (step 7). In this case, because the toe angle sensors 6L and 6R are normal and the actuators 5L and 5R are able to determine their own positions, the normal actuator is actuated to a position which is symmetric to the position of the failed actuator (FIG. 5). Thereby, the two wheels balance with each other, and the vehicle is able to travel in a stable manner.

An abnormal condition of any of the drive systems can be determined from an abnormal relationship between the duty ratio (or voltage) of the electric power applied to the electric motor and the feedback current (or the motor torque) or from an abnormal supply voltage to the electric motor.

The abnormal toe angle is changed to a target position at a speed appropriate to the nature of the component that has failed or the running condition of the vehicle as quickly as possible without causing any discomfort to the vehicle operator.

Thus, the present invention allows a fail-safe system for a variable toe angle control system at a relatively low cost.

In the present invention, without regard to whether a fault is detected in any of the drive systems or in any of the sensor systems, when changing the toe angle of the normal side is changed in relation to the toe angle of the faulty side which is known, the toe angles of the right and left wheels may be controlled to asymmetric values such as to change the oversteer/understeer tendency of the vehicle, or as to enable the vehicle to travel along a straight path when the vehicle is traveling on a split-μ road surface.

Although the present invention has been described in terms of a preferred embodiment thereof, it is obvious to a person skilled in the art that various alterations and modifications are possible without departing from the scope of the present invention which is set forth in the appended claims. For instance, the foregoing embodiment was directed to an application to rear wheels of a vehicle, but may also be applied to front wheels with slight modification to the embodiment which is obvious to a person skilled in the art.

The contents of the original Japanese patent application on which the Paris Convention priority claim is made for the present application are incorporated in this application by reference.

The invention claimed is:

1. A variable toe angle control system for a vehicle, comprising:
    a pair of actuators for individually varying a toe angle of a right wheel and a left wheel;
    a pair of sensors for individually detecting the toe angle of the right wheel and the left wheel; and
    a control unit for determining a target value for each of the right and left wheels according to operating conditions of the vehicle and supplying a control signal to each of the actuators according to an output of the corresponding sensor and the corresponding target value,
    wherein when the control unit detects an abnormal operation in a control system of the variable toe angle control system, the control unit actuates the pair of actuators such that the toe angle of the right wheel and the toe angle of the left wheel are zero, and
    wherein when the control unit detects an abnormal operation in at least one of the pair of actuators, the control unit actuates the other actuator such that the toe angle of the right wheel is symmetric to the toe angle of the left wheel.

2. A method for controlling toe angles of a vehicle in a variable toe angle control system, comprising:
    preparing a pair of actuators for individually varying a toe angle of a right wheel and a left wheel;
    preparing a pair of sensors for individually detecting the toe angle of the right wheel and the left wheel;
    determining a target value for the right wheel and the left wheel according to operating conditions of the vehicle;
    supplying a control signal to each of the actuators according to an output of the corresponding sensor and the corresponding target value;
    when an abnormal operation in a control system of the variable toe angle control system, actuating the pair of actuators such that the toe angle of the right wheel and the toe angle of the left wheel are zero, and
    when the control unit detects an abnormal operation in at least one of the pair of actuators, actuating the other actuator such that the toe angle of the right wheel is symmetric to the toe angle of the left wheel.

3. The variable toe angle control system according to claim 1, further comprising a stopper for each of the right and left wheels, wherein when at least one of the sensors is found to be faulty, the two actuators are actuated until the actuators reach positions corresponding to the stoppers.

4. The method according to claim 2, further comprising preparing a stopper for each of the right and left wheels, and, when at least one of the sensors is found to be faulty, actuating both the actuators until the actuators reach positions corresponding to the stoppers.

5. The variable toe angle control system according to claim 1, wherein when the control unit detects an abnormal operation in at least one of the pair of sensors, the control unit actuates the pair of actuators such that the toe angle of the right wheel and the toe angle of the left wheel is a predetermined inward toe angle by open loop control.

6. The method according to claim 2, further comprising actuating the pair of actuators such that the toe angle of the right wheel and the toe angle of the left wheel is a predetermined toe angle by open loop control when an abnormal operation is detected in at least one of the pair of sensors.

* * * * *